US011086313B2

United States Patent
Tsaplin

(10) Patent No.: US 11,086,313 B2
(45) Date of Patent: Aug. 10, 2021

(54) GESTURE-BASED UNMANNED AERIAL VEHICLE (UAV) CONTROL

(71) Applicant: ATLAS DYNAMIC LIMITED, Dublin (IE)

(72) Inventor: Maksym Tsaplin, Riga (LV)

(73) Assignee: Atlas Dynamic Limited, Dublin (IE)

( * ) Notice: Subject to any disclaimer, the term of this patent is extended or adjusted under 35 U.S.C. 154(b) by 309 days.

(21) Appl. No.: 15/497,723

(22) Filed: Apr. 26, 2017

(65) Prior Publication Data

US 2017/0315547 A1 Nov. 2, 2017

Related U.S. Application Data

(60) Provisional application No. 62/328,536, filed on Apr. 27, 2016.

(51) Int. Cl.
| | |
|---|---|
| *G05D 1/00* | (2006.01) |
| *G06F 1/16* | (2006.01) |
| *H04N 5/232* | (2006.01) |
| *B64C 39/02* | (2006.01) |
| *G06F 3/01* | (2006.01) |

(52) U.S. Cl.
CPC ......... *G05D 1/0016* (2013.01); *B64C 39/024* (2013.01); *G06F 1/1694* (2013.01); *G06F 1/1698* (2013.01); *G06F 3/017* (2013.01); *H04N 5/23203* (2013.01); *H04N 5/23206* (2013.01); *B64C 2201/127* (2013.01); *B64C 2201/146* (2013.01)

(58) Field of Classification Search
CPC ... G05D 1/0016; B64C 39/024; G06F 1/0694; G06F 1/1698; G06F 3/017; H04N 5/23206
USPC .......................................................... 701/2
See application file for complete search history.

(56) References Cited

U.S. PATENT DOCUMENTS

| | | | |
|---|---|---|---|
| 2015/0370250 A1* | 12/2015 | Bachrach | G05D 1/0094 701/2 |
| 2016/0364004 A1* | 12/2016 | Ekandem | B64C 13/04 |
| 2017/0242432 A1* | 8/2017 | Raz | G05D 1/0038 |
| 2018/0046187 A1* | 2/2018 | Martirosyan | G05D 1/0094 |
| 2018/0094998 A1* | 4/2018 | Youssef | G01L 13/06 |

\* cited by examiner

*Primary Examiner* — Yazan A Soofi
(74) *Attorney, Agent, or Firm* — FisherBroyles, LLP; Ariel Reinitz

(57) ABSTRACT

Systems and methods are disclosed for gesture-based UAV control. In one implementation, one or more inputs are received at a device. The one or more inputs are processed and one or more commands are computed with respect to an UAV. The one or more commands are then provided to the UAV.

18 Claims, 7 Drawing Sheets

GESTURE-BASED UNMANNED AERIAL VEHICLE (UAV) CONTROL

CROSS-REFERENCE TO RELATED APPLICATION

This application is related to and claims the benefit of U.S. Patent Application No. 62/328,536, filed Apr. 27, 2016 which is incorporated herein by reference in its entirety.

TECHNICAL FIELD

Aspects and implementations of the present disclosure relate to data processing, and more specifically, to gesture-based unmanned aerial vehicle (UAV) control.

BACKGROUND

Unmanned vehicles (e.g., unmanned aerial vehicles (UAVs)) can be used for a wide variety of tasks. Such vehicles can be controlled in various ways.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, systems and methods are disclosed for gesture-based unmanned aerial vehicle (UAV) control. In one implementation, one or more inputs are received at a device. The one or more inputs are processed and one or more commands are computed with respect to an unmanned aerial vehicle (UAV). The one or more commands are then provided to the UAV.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to gesture-based unmanned aerial vehicle (UAV) control.

It can be appreciated that unmanned vehicles (e.g., unmanned aerial vehicles (UAV) or 'drones,' remote controlled cars, boats, snowboards, etc.) may be difficult to control and/or may be associated with complex control interfaces which are difficult for users (particularly novice users) to utilize. Accordingly, described herein in various implementations are technologies that enable gesture-based UAV control.

It can therefore be appreciated that the described technologies are directed to and address specific technical challenges and longstanding deficiencies in multiple technical areas, including but not limited to communication interfaces, mobile applications, and intelligent personal assistants. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

At this juncture it should also be noted that various implementations of the disclosed technologies provide numerous advantages and improvements upon existing approaches. As noted, existing UAV controls/interfaces are often complex and not intuitive for many users. As described herein, in lieu of such interfaces, users can utilize a device having various sensors to generate and transmit navigational commands to a UAV based on gestures provided by the user.

Figure 1:
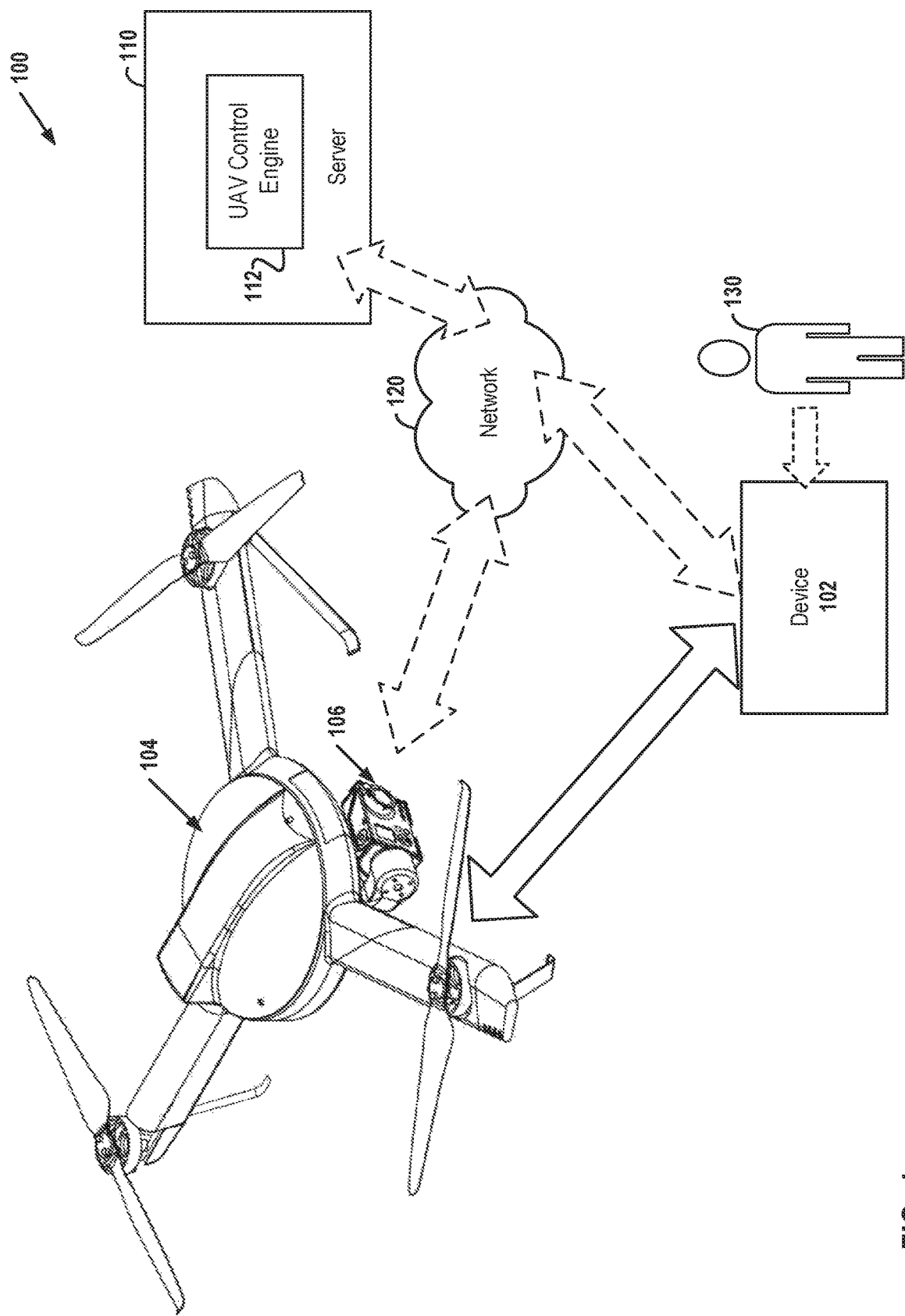
FIG. 1 illustrates an example system, in accordance with an example embodiment.

FIG. 1 depicts an illustrative system architecture 100, in accordance with one implementation of the present disclosure. The system architecture 100 includes device 102 and UAV 104. These various elements or components can be connected to one another directly and/or via network 120, which can be a public network (e.g., the Internet), a private network (e.g., a local area network (LAN) or wide area network (WAN)), or a combination thereof. Further aspects of one or more of the various devices depicted in FIG. 1 are described below with respect to FIGS. 2 and 6.

User 130 can be a human user who interacts with device 102. For example, user 130 can provide various inputs (e.g., via an input device/interface such as a keyboard, mouse, touchscreen, etc.) to device 110. Device 102 can also display, project, and/or otherwise provide content to user 130 (e.g., via output components such as a screen, speaker, etc.).

Device 102 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, a wearable device, an in-vehicle computer/system, any combination of the above, or any other such computing device capable of implementing the various features described herein. Various applications, such as mobile applications ('apps'), web browsers, etc. (not shown) may run on the device (e.g., on the OS of the device). It should be understood that, in certain implementations, device 102 can also include and/or incorporate various sensors and/or communications interfaces (including but not limited to those depicted in FIG. 2 with respect to device 102 and/or described herein). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc.

Figure 2:
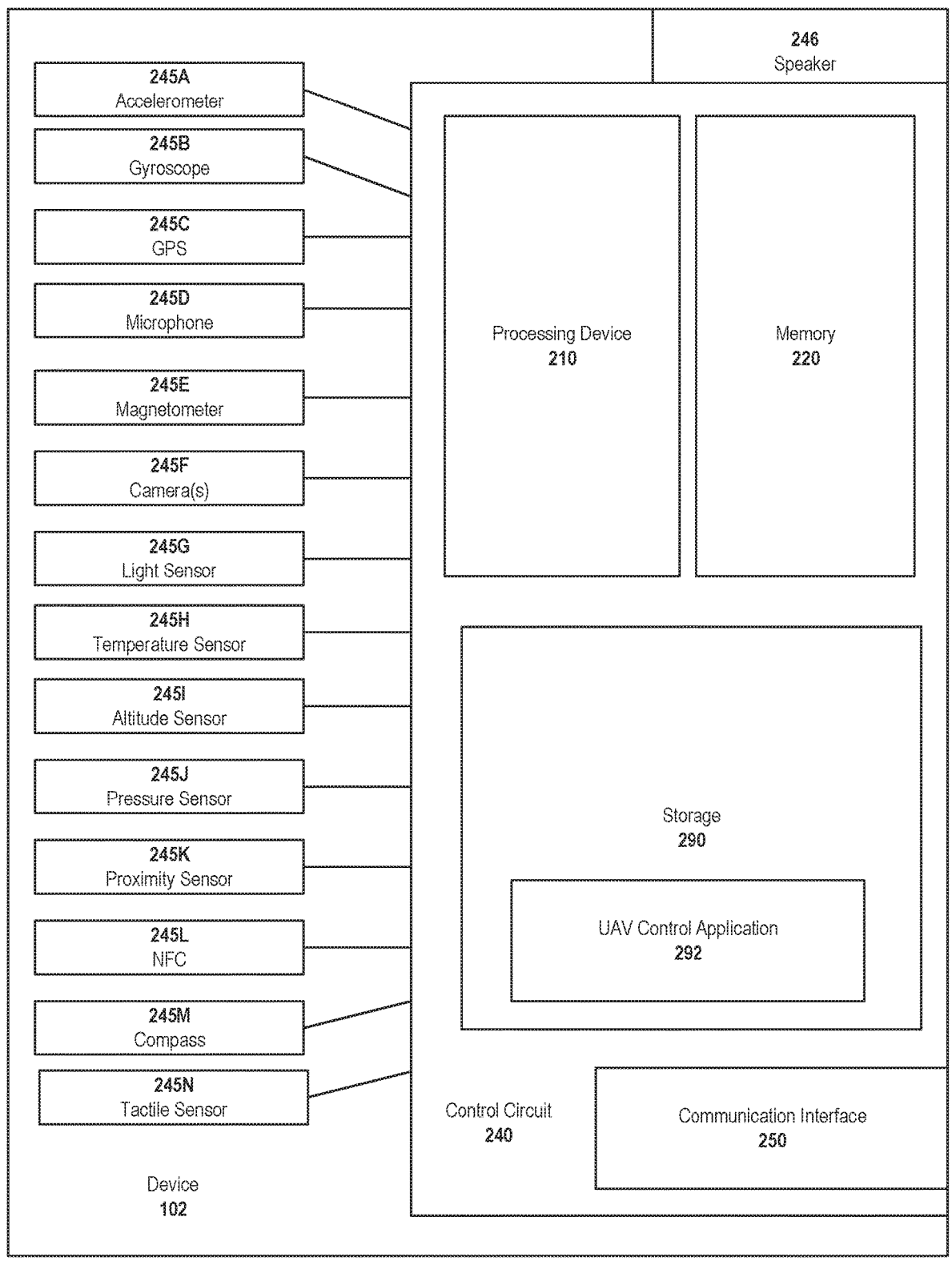
FIG. 2 illustrates an example device, in accordance with an example embodiment.

As noted, in certain implementations, device 102 can also include and/or incorporate various sensors and/or communications interfaces. By way of illustration, FIG. 2 depicts one example implementation of device 102. As shown in FIG. 2, device 102 can include a control circuit 240 (e.g., a motherboard) which is operatively connected to various hardware and/or software components that serve to enable various operations, such as those described herein. Control circuit 240 can be operatively connected to processing device 210 and memory 220. Processing device 210 serves to execute instructions for software that can be loaded into memory 220. Processing device 210 can be a number of processors, a multi-processor core, or some other type of processor, depending on the particular implementation. Further, processing device 210 can be implemented using a number of heterogeneous processor systems in which a main processor is present with secondary processors on a single chip. As another illustrative example, processing device 210 can be a symmetric multi-processor system containing multiple processors of the same type.

Memory 220 and/or storage 290 may be accessible by processing device 210, thereby enabling processing device 210 to receive and execute instructions stored on memory 220 and/or on storage 290. Memory 220 can be, for example, a random access memory (RAM) or any other suitable volatile or non-volatile computer readable storage medium. In addition, memory 220 can be fixed or removable. Storage 290 can take various forms, depending on the particular implementation. For example, storage 290 can contain one or more components or devices. For example, storage 290 can be a hard drive, a flash memory, a rewritable optical disk, a rewritable magnetic tape, or some combination of the above. Storage 290 can also be fixed or removable.

As shown in FIG. 2, in certain implementations storage 290 can store UAV control application 292. In certain implementations, UAV control application 292 can be, for example, instructions, an 'app,' etc., that can be loaded into memory 220 and/or executed by processing device 210, in order to enable a user of the device to generate and/or transmit navigational commands to one or more vehicles such as UAV 104, receive feedback, etc., from UAV 104, etc., such as in a manner described herein.

A communication interface 250 is also operatively connected to control circuit 240. Communication interface 250 can be any interface (or multiple interfaces) that enables communication between device 102 and one or more external devices, machines, platforms, systems, and/or elements (including but not limited to those depicted in FIG. 1 and described herein). Communication interface 250 can include (but is not limited to) a modem, a Network Interface Card (NIC), an integrated network interface, a radio frequency transmitter/receiver (e.g., WiFi, Bluetooth, cellular, NFC), a satellite communication transmitter/receiver, an infrared port, a USB connection, or any other such interfaces for connecting device 102 to other computing devices, systems, platforms, and/or communication networks such as the Internet. Such connections can include a wired connection or a wireless connection (e.g. 802.11) though it should be understood that communication interface 250 can be practically any interface that enables communication to/from the control circuit 240 and/or the various components described herein.

At various points during the operation of described technologies, device 102 can communicate with one or more other devices, systems, platforms, servers, etc., such as those depicted in FIG. 1 and/or described herein. Such devices, systems, platforms, servers, etc., can transmit and/or receive data to/from the device 102, thereby enhancing the operation of the described technologies, such as is described in detail herein. It should be understood that the referenced devices, systems, platforms, servers, etc., can be in direct communication with device 102, indirect communication with device 102, constant/ongoing communication with device 102, periodic communication with device 102, and/or can be communicatively coordinated with device 102, as described herein.

Also connected to and/or in communication with control circuit 240 of device 104 are one or more sensors 245A-245N (collectively, sensors 245). Sensors 245 can be various components, devices, and/or receivers that can be incorporated/integrated within and/or in communication with device 102. Sensors 245 can be configured to detect one or more stimuli, phenomena, or any other such inputs, described herein. Examples of such sensors 245 include, but are not limited to, an accelerometer 245A, a gyroscope 245B, a GPS receiver 245C, a microphone 245D, a magnetometer 245E, a camera 245F, a light sensor 245G, a temperature sensor 245H, an altitude sensor 245I, a pressure sensor 245J, a proximity sensor 245K, a near-field communication (NFC) device 245L, a compass 245M, and a tactile sensor 245N. As described herein, device 102 can perceive/receive various inputs from sensors 245 and such inputs can be used to initiate, enable, and/or enhance various operations and/or aspects thereof, such as is described herein. By way of example, inputs received via GPS receiver 245C can be processed to determine a location of device 102. The determination of such a location (based on inputs originating from GPS receiver 245C) can be utilized in conjunction with various functionality described herein (e.g., with respect to generating and/or providing navigational commands to UAV 104 in relation to the position of device 102), as described herein.

At this juncture it should be noted that while the foregoing description (e.g., with respect to sensors 245) has been directed to device 102, various other devices, systems, servers, platforms, etc. (such as are depicted in FIG. 1 and/or described herein) can similarly incorporate the components, elements, and/or capabilities described with respect to device 102. For example, UAV 104 may also incorporate one or more of the referenced components, elements, and/or capabilities. It should also be understood that certain aspects and implementations of various devices, systems, servers, platforms, etc., such as those depicted in FIG. 1 and/or described herein, are also described in greater detail below in relation to FIG. 6.

Moreover, as also shown in FIG. 1, in certain implementations device 102 can connect to and/or otherwise communicate with other devices/machines via network 120. As shown in FIG. 1, device 102 can communicate with server 110 which can be, for example, a server computer, computing device, storage service (e.g., a 'cloud' service), etc.

Server 110 can include an UAV control engine 112 and which can be a program, module, set of instructions etc. stored on and/or executed by the server. For example, in certain implementations device 102 can communicate with server 110 (via network 120), e.g., to transmit instructions, commands, etc. directed to UAV 104. Upon receipt of such instructions, server 110 (e.g., in conjunction with UAV control engine 112) can relay, provide, etc., such received instructions to UAV 104 (e.g., via network 120). In certain implementations, UAV 104 can provide information, data, feedback, updates, etc., back to server 110 (e.g., via network 120). Server 110 can then relay, provide, etc., such information back to device 102 (and such information, etc., can be provided/presented to user 130, e.g., via UAV control application 292).

Additionally, in certain implementations server 110 (e.g., in conjunction with UAV control engine 112) can process the instructions, commands, etc., received from device 102 in relation to data, information, updates, etc., received from UAV 104. In doing so, various aspects of the instructions, commands, etc., as provided by/received from device 102 can be adjusted, modified, etc., e.g., to account for information, updates, etc., provided by/received from UAV 104. Doing so can be advantageous, for example, in order to perform such processing operations at server 110 (rather than at device 102, e.g., in a scenario in which device 102 is a portable which may have limited processing resources, power consumption limitations, etc.). Additionally, enabling communications between device 102 and UAV 104 via network 120 and/or server 110 can enable such communications to continue in scenarios in which direct communication between device 102 and UAV 104 may be inconsistent, etc., e.g., on account of the distance between device 102 and UAV 104 and limitations of various communication interfaces (e.g. Bluetooth) in scenarios in which the UAV is a significant distance away from device 102.

Unmanned vehicle 104 (e.g., a UAV or 'drone') may include multi-rotor aircrafts such as helicopters, tricopters, quadcopters, hexacopters, octocopters, and the like. UAV 104 may be used in a wide variety of applications including but not limited to remote sensing, aerial surveillance, oil, gas and mineral exploration and production, transportation, scientific research, aerial photography or videography, mapping, disaster reporting, search and rescue, mapping, power line patrol, weather reporting and/or prediction, traffic detection and reporting.

It should be understood that while vehicle 104 is described herein as a UAV, this is simply for the sake of illustration. Accordingly, in other implementations the described technologies can be applied with respect to any number of other objects, devices, etc. For example, in addition to aircraft (such as UAVs, fixed-wing aircraft such as airplanes, rotary-wing aircraft such as helicopters, etc.), the described technologies can also be implemented with respect to water vehicles (e.g., boats, ships, submarines, etc., or motor vehicles such as a cars, trucks, etc.

In various embodiments, UAV 104 can be autonomously-controlled, e.g., by an onboard controller or processor, remotely-controlled by a remote device (e.g., a ground station or a hand-held remote control device such as device 102), or jointly controlled by both. In some embodiments, the UAV may be configured to carry a payload device 106 such as a camera or a video camera via a carrier (e.g., as depicted in FIG. 1). The payload device may be used to capture images of surrounding environment, collect samples, or perform other tasks.

Described herein are technologies that enable device 102 to generate and provide commands, instructions, etc. to UAV 104. Such commands can be generated, for example, based on the manner in which a user provides inputs to and/or otherwise interacts with device 102. For example, in certain implementations the described technologies can generate and provide commands to UAV 104 in a manner that simulates the experience of a 'selfie stick' (e.g., a stick to which a camera device can be attached and held by a user in a manner that enables the user to capture images such as 'selfies' from an overhead perspective). In certain implementations, the referenced commands can be generated by UAV control application 292 executing on device 102.

By way of illustration, in certain implementations, the described technologies can enable a user to define or input a distance setting input/parameter. Such an input/parameter can define the distance (e.g., 10 meters, 15 meters, etc.) (and/or angle) from which UAV 104 is to be positioned relative to the user/device. Having generated/provided such a command, UAV 104 can position itself at such a distance from the device and can maintain such a distance (e.g., if the device/user moves) based on ongoing positional updates provided by the device (e.g., based on GPS coordinates, etc., as perceived by one or more of sensors 245). Accordingly, such a 'virtual stick' setting can enable the user to set a distance at which the UAV is to be positioned relative to the user/device, and have such position maintained (e.g., without necessitating further input by the user/device).

Moreover, in certain implementations the described technologies can be configured to generate navigational commands (and transmit them to UAV 104) based on various movements of the device 102 (as perceived/determined, for example, based on inputs originating from sensors 245, e.g., accelerometer, gyroscope, etc.). For example, if the user moves the phone from left to right, corresponding commands (instructing the UAV to move from left to right) can be generated and provided to the UAV. In doing so, the user can navigate the UAV in an intuitive manner.

Figure 3:
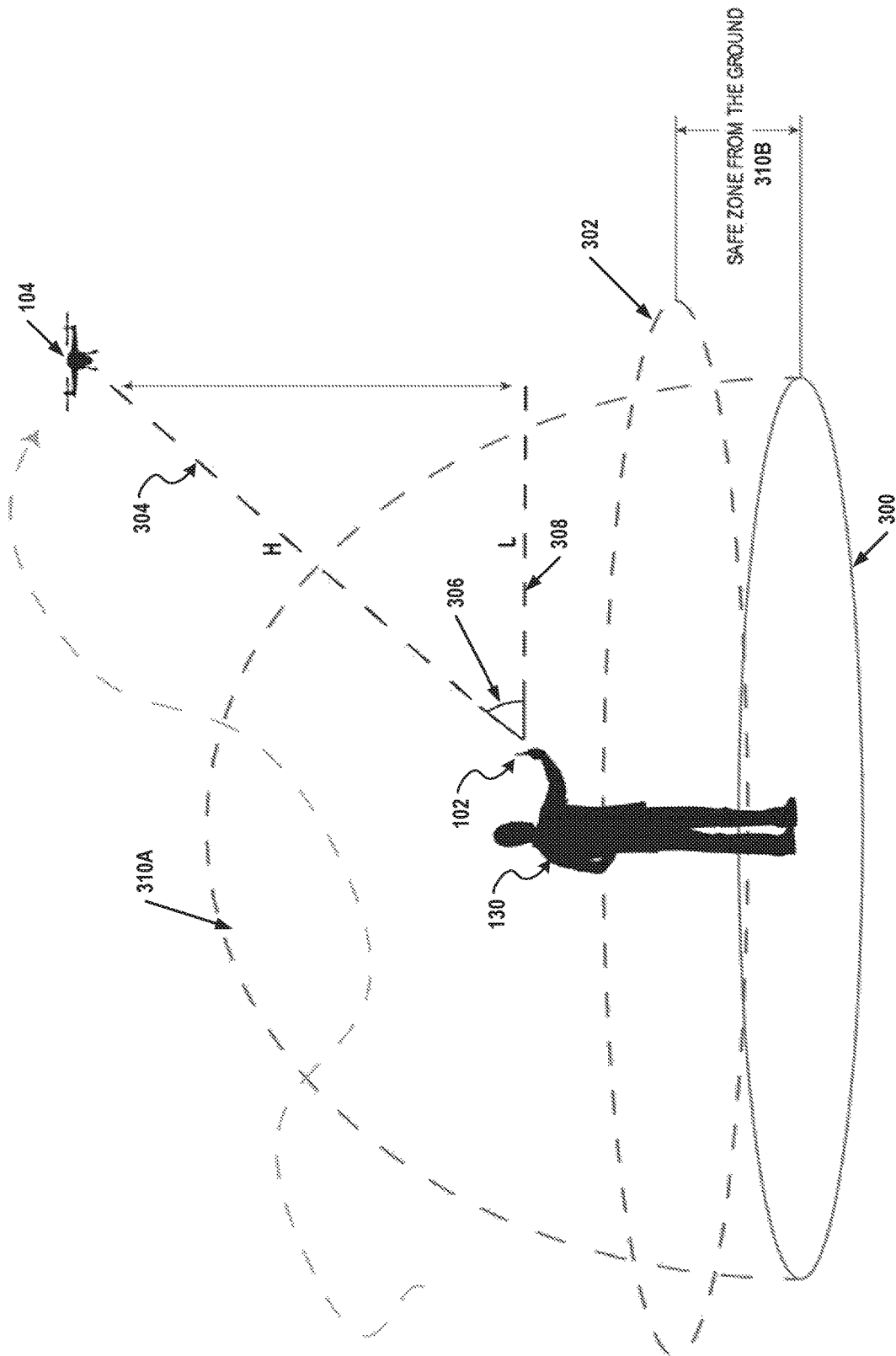
FIG. 3 illustrates example scenarios described herein, according to an example embodiment.

It should be further understood that the commands as generated by device 102 and/or as processed/executed at UAV 104 can account for various preferences, limitations, etc. For example, the referenced commands can be generated/executed while also accounting for various safety and/or navigational preferences, e.g., not moving the UAV too fast, not approaching other objects/users that can be perceived, not coming too close to the user, etc. Thus, even if the inputs provided by the user initially correspond to commands that may be unsafe, the described technologies can modify the referenced commands to ensure that they comply with the referenced preferences, etc. For example, as shown in FIG. 3, various virtual 'safe zones' can be identified, defined, etc., e.g., around a device, user, etc., such that, irrespective of commands provided by the user, such commands can be modified to ensure that the UAV does not enter the 'safe zone.' For example, as shown in FIG. 3, safe zone 310A (as represented by the area below the corresponding dashed line) can define an area around device 102/user 130 within which UAV 104 is not to enter (and various commands, operations, etc., can be adjusted accordingly to maintain such a safe zone). Additionally, safe zone 310B (as represented by the area between dashed line 302 and the ground 300) can define an area (e.g., below the plane of 302) within which UAV 104 is not to enter (and various commands, operations, etc., can be adjusted accordingly to maintain such a safe zone).

By way of further illustration, in certain implementations the referenced commands can be generated based on inputs generated/received by one or more of sensors 245 of device 102. For example, by rotating device 102 about its axis, input(s) can be received (e.g., from sensors including GPS, magnetometer, accelerometer and gyroscope). Based on such inputs, the relative and/or absolute (e.g., geographic)

position of the device 102 within space can be determined. In doing so, coordinate(s) (e.g., XYZ coordinates, latitude/longitude, etc.) of the position of the device 102 can be determined or otherwise defined. Having done so, various parameters can be defined by the device 102 with respect to UAV 104. For example, as shown in FIG. 3, the depicted 'H' parameter/value (corresponding to the dashed line 304 as shown) can be defined which can dictate a distance (and/or height aspects) that the UAV is to maintain from device 102. Having received such a parameter, the device 102 (e.g., in conjunction with the referenced UAV control application) can further compute an angle 306 of the device 102 relative to the ground 300 and then further compute a height and the depicted 'L' parameter (corresponding to dashed line 308 as shown) which can correspond to a horizontal distance (e.g., away from the device 102) to maintain between the UAV and the device 102. Having computed the referenced parameter(s), GPS coordinate(s) (to correspond to the position of the UAV) can be computed and applied/provided to the UAV 104.

As noted above and depicted in FIG. 3, in certain implementations various 'safe zones' 310A, 310B can be defined. Such area(s) can ensure that various commands that are generated and/or executed are done in a manner that is consistent with preventing the UAV from crashing into the user/ground and/or can ensure that a safe distance is maintained between UAV 104 and the user (e.g., to prevent user injury).

Moreover, in certain implementations various commands can be generated/provided with respect to various other UAV maneuvers, functions, etc. For example, in certain implementations the described technologies can enable the user/device to generate and/or provide commands to UAV 104 in response to various gestures or inputs, such as are described herein. In certain implementations, such commands can correspond to the acceleration of the UAV, the power of gears of the UAV, the direction of the UAV, etc. In doing so, for example, a single movement or gesture with respect to the device 102 can enable the generation/transmission of one or more commands to the UAV.

As noted above, in certain implementations various inputs provided to/received at device 102 can be used to generate/provide corresponding navigation (or other) commands to UAV 104. In other implementations, various commands can be generated based on gestures received/identified at device 102. For example, a particular gesture (as identified based on a pattern, motion signature, etc., of sensor inputs, e.g., inputs received from one or more of sensors 245 such as gyroscope, accelerometers, etc.) can be associated with/bound to a particular command with respect to UAV 104.

Figure 4:
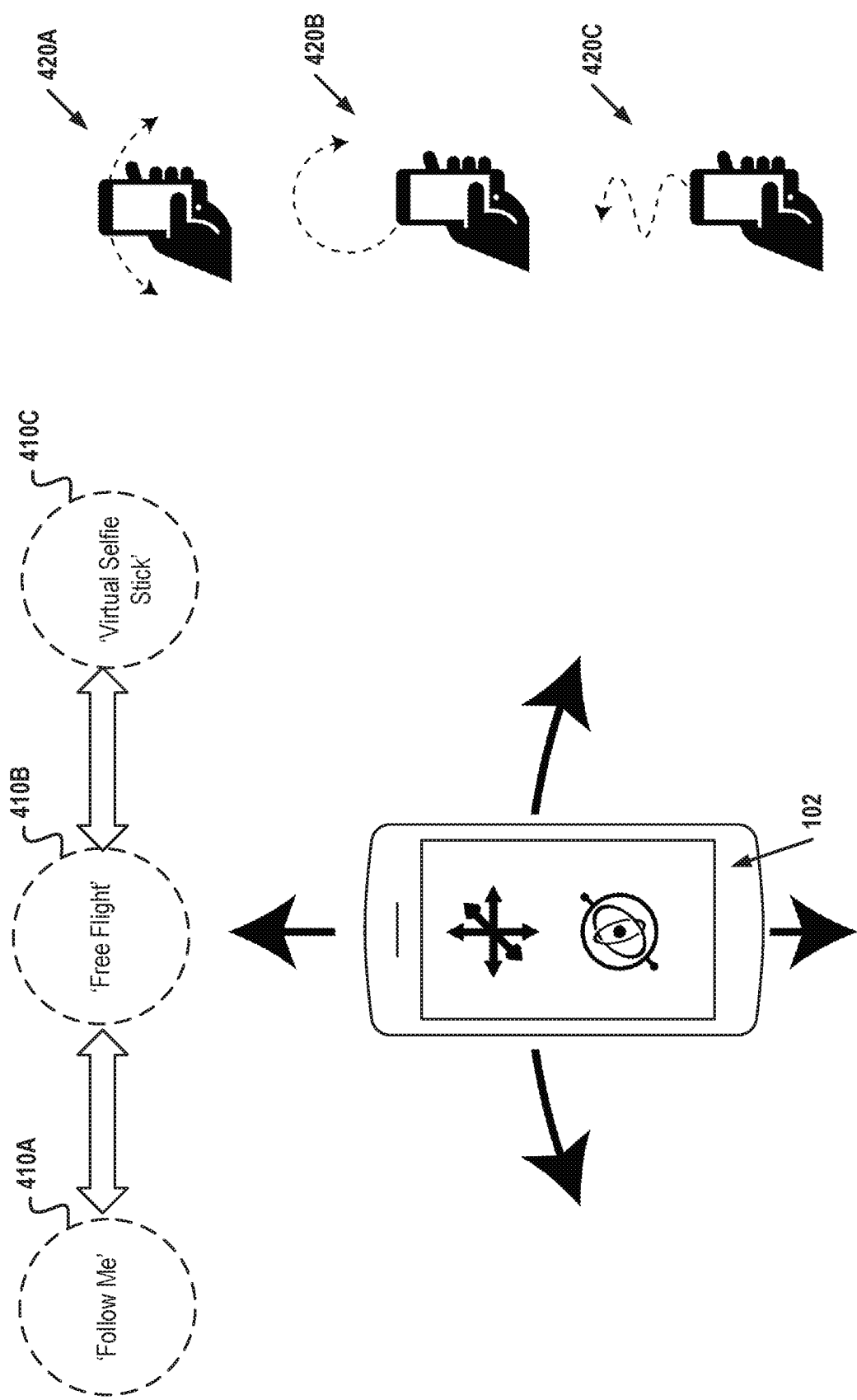
FIG. 4 illustrates example scenarios described herein, according to an example embodiment.

By way of illustration, FIG. 4 depicts various aspects of the referenced gesture commands, through which the user can provide/initiate various gestures with respect to device 102. For example, gestures 420A-420C illustrate various example patterns, motions, sequences, motion signatures etc. (of device 102) that can be identified. It should be understood that the depicted gestures/commands are exemplary and that others are also contemplated. Additionally, it should be understood that a user may define custom commands.

Moreover, in certain implementations one or more of the referenced gestures can be associated with certain UAV commands which can correspond to/be associated with a particular navigation mode of the UAV and/or operation mode of the UAV. As shown in FIG. 4, examples of such navigation/operation mode(s) include but area not limited to a 'follow me' mode 410A (in which UAV is configured/instructed to maneuver, navigate, operate, etc., such that the UAV follows device 102 and/or user 130), a 'free flight' mode 410B (in which operations, maneuvers, etc. of the UAV may occur only in response to inputs/commands from device 102), and/or a 'virtual selfie stick' mode 410C (in which UAV is configured/instructed to maneuver, navigate, operate, etc., such that the UAV maneuvers and/or maintains position, captures image(s), etc., in accordance with various inputs, parameters, etc., as described above). In doing so, a user can select a mode (e.g., 'free flight' mode 410B) and subsequent input(s) (e.g., motion inputs) of device 102 can be used to identify a corresponding command within the 'free flight' mode commands (e.g., as opposed to another command that the same motion of device 102 may correspond to, e.g., within the 'virtual selfie stick' mode 410C set of commands). In doing so, user 130 can efficiently and intuitively change the operation/navigation mode with respect to which device 102 provides commands to UAV 104, as described below. Additionally, in doing so the same (or similar) input(s) (e.g., motion input(s)) can be used to initiate different commands, e.g., based on the identified/selected operation/navigation mode.

In certain implementations inputs from the accelerometer of device 102 can be used to generate commands that correspond to a speed (and/or other navigational aspects) of the UAV. For example, the user can hold device 102 and based on the speed at which the angle of the device 102 is changed by the user (e.g., as perceived by accelerometer, etc.), corresponding commands can be generated and provided to UAV 104 which dictate that the UAV should travel at a speed that corresponds to the movement of the device. In doing so, the user's motion of the device can dictate the speed at which the UAV travels in an intuitive manner.

Moreover, in certain implementations the relative position of the device (e.g., up/down, left/right, etc.), as perceived by the referenced sensor(s), can be used to generate corresponding commands which can be provided to the UAV. Such commands can instruct the UAV to navigate in a corresponding fashion (e.g., up/down, left/right, etc.).

Figure 5A:
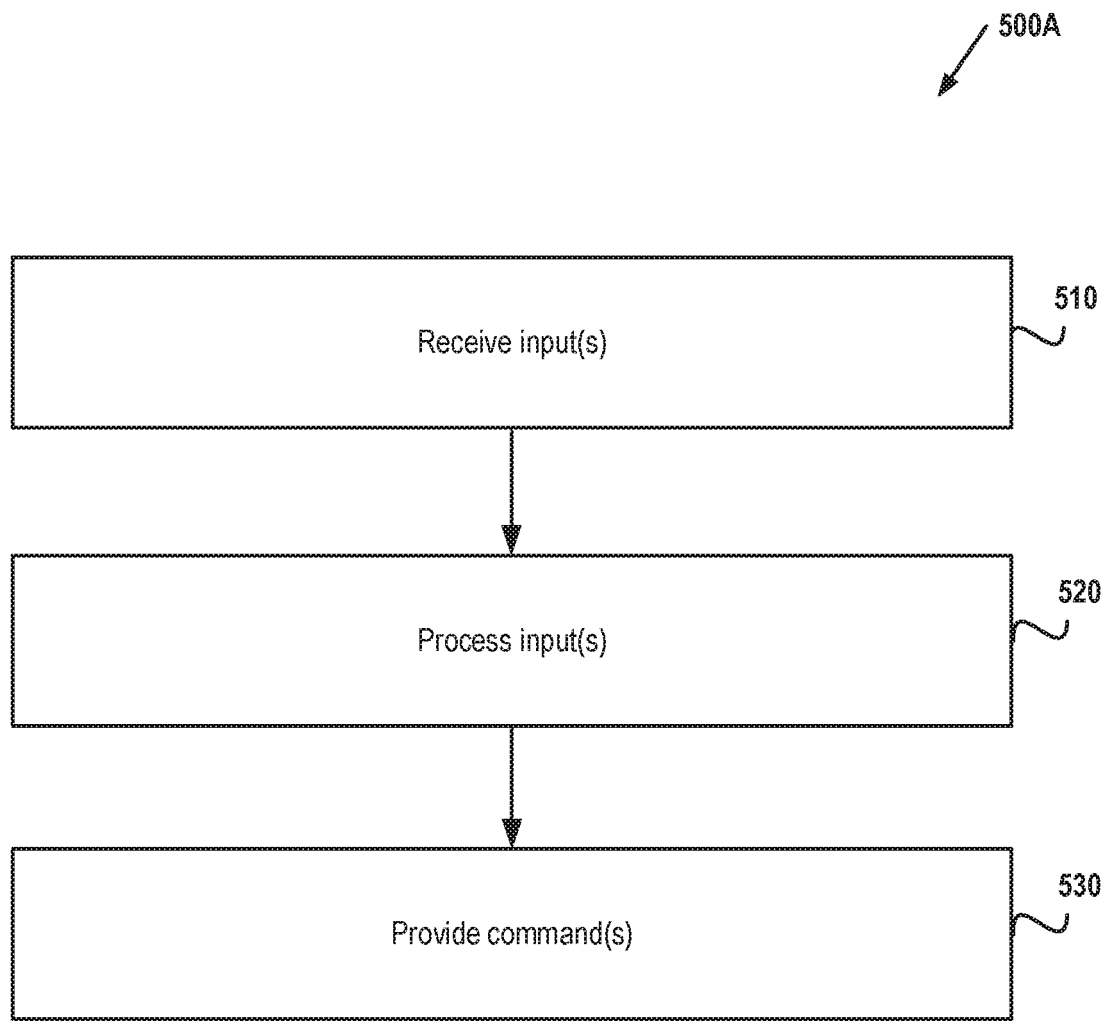
FIG. 5A is a flow chart illustrating a method, in accordance with an example embodiment, for gesture-based UAV control.

FIG. 5A depicts a flow diagram of aspects of a method 500A for gesture-based UAV control. The method is performed by processing logic that may comprise hardware (circuitry, dedicated logic, etc.), software (such as is run on a computing device, such as those described herein), or a combination of both. In one implementation, the method 500A is performed by one or more elements depicted and/or described in relation to FIG. 1 (including but not limited to device 102) and/or FIG. 2 (e.g., UAV control application 292 and/or device 102), while in some other implementations, one or more blocks of FIG. 5A may be performed by another machine or machines (e.g., server 110).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

At operation 510, one or more inputs (e.g., sensor inputs) can be received, e.g., at device 102. In certain implementations such input(s) can include motion input(s), such as those originating from sensor(s) of device 102 (e.g., gyroscope, accelerometer, GPS, etc.). For example, such input(s) can include an acceleration input.

In certain implementations, the referenced input(s) can include a distance setting input. Such a distance setting input can, for example, define a distance, such as a distance from which the UAV is to be positioned relative to the device and/or user (e.g., as described in detail above).

Moreover, in certain implementations a position of the device can be determined, e.g., within space. As described above, such a determination can be computed based on various input(s) (e.g., from sensors such as GPS receiver, magnetometer, accelerometer and gyroscope, based upon which the position of the device 102 within space and/or coordinate(s) of the position of the device 102 can be determined).

At operation 520, the one or more inputs can be processed. In doing so, one or more commands, instructions, etc. can be computed, e.g., with respect to an UAV 104. Such command(s) can include, for example, a motion command (e.g., a command that directs the UAV to move in a particular manner). In certain implementations, such a motion command can correspond to motion input(s) (e.g., as received at operation 510 and described above). For example, as described above, having received (e.g., at operation 510) acceleration input(s) (reflecting an acceleration of device 102), command(s) that dictate a speed at which the UAV is to travel can be generated (e.g., based on/corresponding to the received acceleration).

In certain implementations, the referenced command(s) can be generated, e.g., based on the received inputs(s). Additionally, in certain implementations such generated command(s) can also be modified, adjusted, etc. For example, various generated command(s) can be modified based on/in view of various preferences, settings, etc., such as a navigation preference associated with the UAV. Such a navigation preference can, for example, define a virtual safe zone (e.g., in an area/space around device 102 and/or user 130, as described in detail above).

By way of illustration, as noted above the referenced input(s) can include and/or be used to compute a position of the device within space and/or a distance setting. Such a position of the device and the distance setting can then be used to generate a navigation command. For example, a navigation command (which reflects how the UAV is or is not to move) can be generated based on the position of the device within the space and the distance setting input, as described above (e.g., with respect to FIG. 3).

By way of illustration, the referenced command(s) can include command(s) that direct, configure, etc., the UAV to determine its own position relative to the device 102 and/or user 130. Such command(s) can also include command(s) to maneuver the UAV to maintain its position, e.g., relative to device 102 and/or user 130 (e.g., consistently maintain the position of UAV 104 15 meters away from device 102 at a 45-degree angle, e.g., based on a distance setting input as described above). Such command(s) can also include a command to capture image(s) (e.g., still images, video, etc., e.g., by a camera, optical sensor, etc., attached to or integrated within UAV 104). At operation 530, the command(s) can be provided, transmitted, etc. to the UAV. As noted above, in certain implementations the command(s) can be provided to the UAV via direct communication, connection, etc., between device 102 and UAV 104. In other implementations the commands can be provided to another machine (e.g., server 110) and then relayed to UAV 104.

Figure 5B:
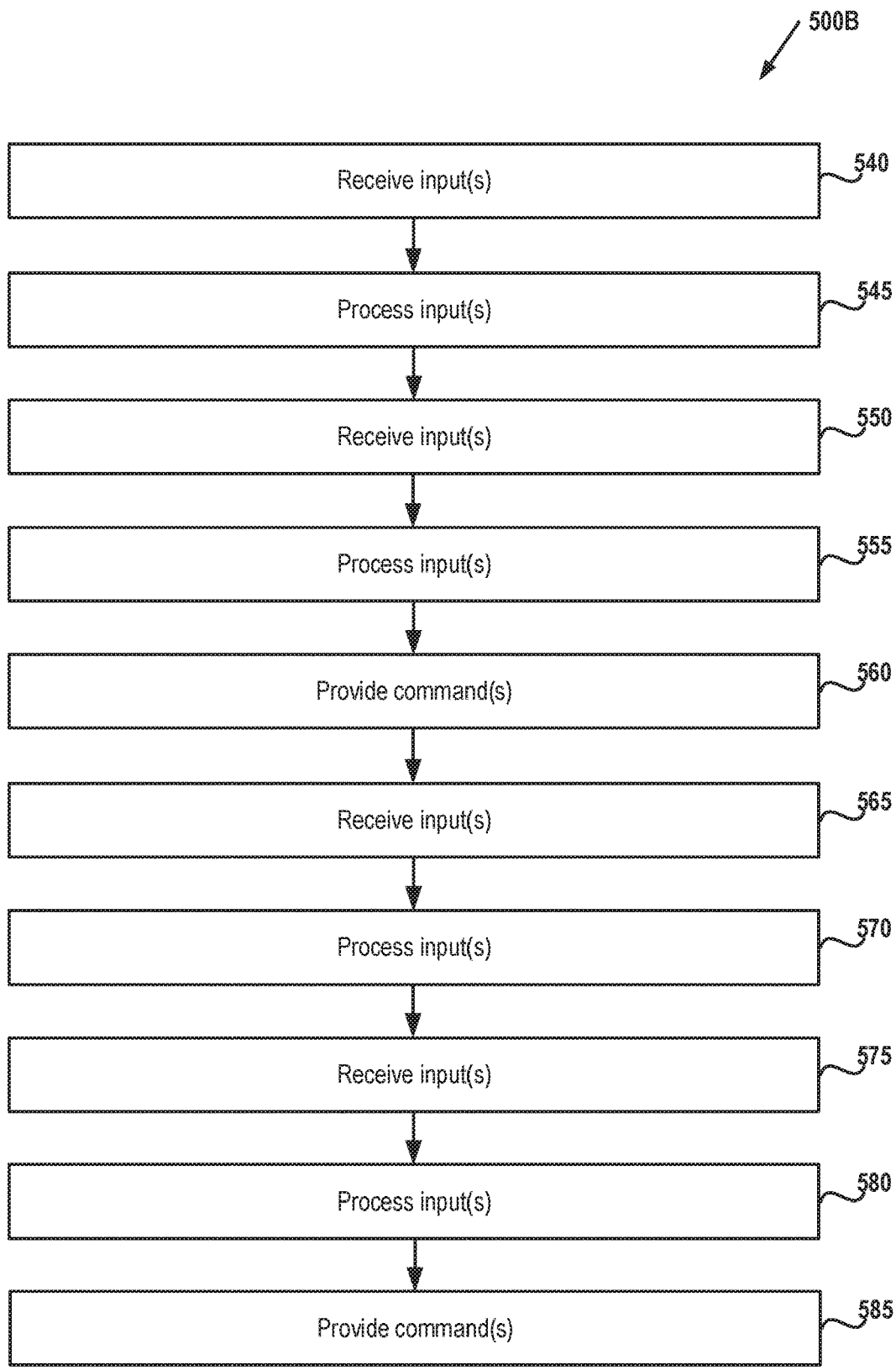
FIG. 5B is a flow chart illustrating another method, in accordance with an example embodiment, for gesture-based UAV control.

FIG. 5B depicts a flow diagram of aspects of a method 500B for gesture-based UAV control. The method is performed by processing logic that may comprise hardware (circuitry, dedicated logic, etc.), software (such as is run on a computing device, such as those described herein), or a combination of both. In one implementation, the method 500B is performed by one or more elements depicted and/or described in relation to FIG. 1 (including but not limited to device 102) and/or FIG. 2 (e.g., UAV control application 292 and/or device 102), while in some other implementations, one or more blocks of FIG. 5B may be performed by another machine or machines (e.g., server 110).

At operation 540, one or more first inputs can be received, e.g., at device 102 (as described above).

At operation 545, such first input(s) (as received at operation 540) can be processed. In doing so, a first gesture (e.g., a motion, sequence, pattern, and/or signature of motions or other inputs, etc.) performed with respect to the device can be determined, identified, etc. (as described above, e.g., with respect to FIG. 4). In certain implementations, such a first gesture can be associated with certain UAV commands, e.g., one or more first UAV commands. Such UAV commands can be associated with a particular navigation mode of the UAV and/or operation mode of the UAV. As described above, examples of such navigation mode(s) and/or operation mode(s) include but area not limited to a 'follow me' mode, a 'free flight' mode, and/or a 'virtual selfie stick' mode, as described above.

At operation 550, one or more second inputs can be received, (e.g., after identifying the first gesture and/or its associated UAV commands) e.g., at device 102 (as described above).

At operation 555, second input(s) (e.g. as received at operation 550) can be processed. In doing so, at least one of the one or more first UAV commands can be identified. For example, having determined (at operation 545) a first gesture that is associated with a first set of UAV commands (e.g., commands associated with a navigation/operation mode, such as a 'free flight' mode), the second (and other subsequent) input(s) received can be processed based on such a first set of commands. In doing so, for example, a motion of device 102 can be used to identify a corresponding command within the referenced first set of commands (e.g., 'free flight' mode commands, as opposed to another command that the same motion of device 102 may correspond to within the 'virtual selfie stick' mode set of commands).

At operation 560, the at least one of the one or more first UAV commands (e.g., as identified at operation 555) can be provided, transmitted, etc. to the UAV (e.g., via direct communication, connection, etc., between device 102 and UAV 104 and/or via another machine).

At operation 565, one or more third inputs can be received, e.g., at device 102 (as described above).

At operation 570, such input(s) (e.g., the one or more third inputs as received at operation 565) can be processed. In doing so, a second gesture (e.g., a motion, sequence, pattern, and/or signature of motions or other inputs, etc.) performed with respect to the device can be determined, identified, etc. (as described above, e.g., with respect to FIG. 4). Such a second gesture can be different than the first gesture (e.g., as identified at operation 545) and can be associated with certain different UAV commands, e.g., one or more second UAV commands. Such UAV command can be associated with a navigation mode of the UAV and/or operation mode of the UAV that may be different from that of the first gesture. For example, the first gesture (as identified at operation 545) may correspond to a 'follow me' mode while the second gestures may correspond to a 'virtual selfie stick' mode.

Accordingly, upon identifying the referenced second gesture, subsequent input(s) (e.g., those received at operation 575) can be processed based on the corresponding (second) set of commands (e.g., in lieu of the first set of commands that previous inputs may have been processed with respect to). In doing so, for example, subsequent input(s) (e.g., motion(s)) of device 102 can be used to identify corresponding command(s) within a second set of commands (e.g., 'virtual selfie stick' mode commands, as opposed to another command that the same motion of device 102 may correspond to within the 'free flight' mode set of commands). In doing so, user 130 can efficiently and intuitively change the operation/navigation mode with respect to which device 102 provides commands to UAV 104. Additionally, in doing so the same (or similar) input(s) (e.g., motion input(s)) can be used to initiate different commands, e.g., based on the identified/selected operation/navigation mode.

At operation 575, one or more fourth inputs can be received, (e.g., after identifying the second gesture and/or its associated UAV commands) e.g., at device 102 (as described above).

At operation 580, the one or more fourth inputs (e.g. as received at operation 575) can be processed. In doing so, at least one of the one or more second UAV commands can be identified. For example, having determined (at operation 570) a second gesture that is associated with a second set of UAV commands (e.g., commands associated with a navigation/operation mode, such as a 'virtual selfie stick' mode), the fourth (and other subsequent) input(s) received can be processed based on such a second set of commands. In doing so, for example, a motion of device 102 can be used to identify a corresponding command within the referenced second set of commands (e.g., 'virtual selfie stick' mode commands, as opposed to another command that the same motion of device 102 may correspond to within the previously identified 'free flight' mode set of commands).

At operation 585, the at least one of the one or more second UAV commands (e.g., as identified at operation 580) can be provided, transmitted, etc. to the UAV (e.g., via direct communication, connection, etc., between device 102 and UAV 104 and/or via another machine).

It should also be noted that while the technologies described herein are illustrated primarily with respect to gesture-based UAV control, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Figure 6:
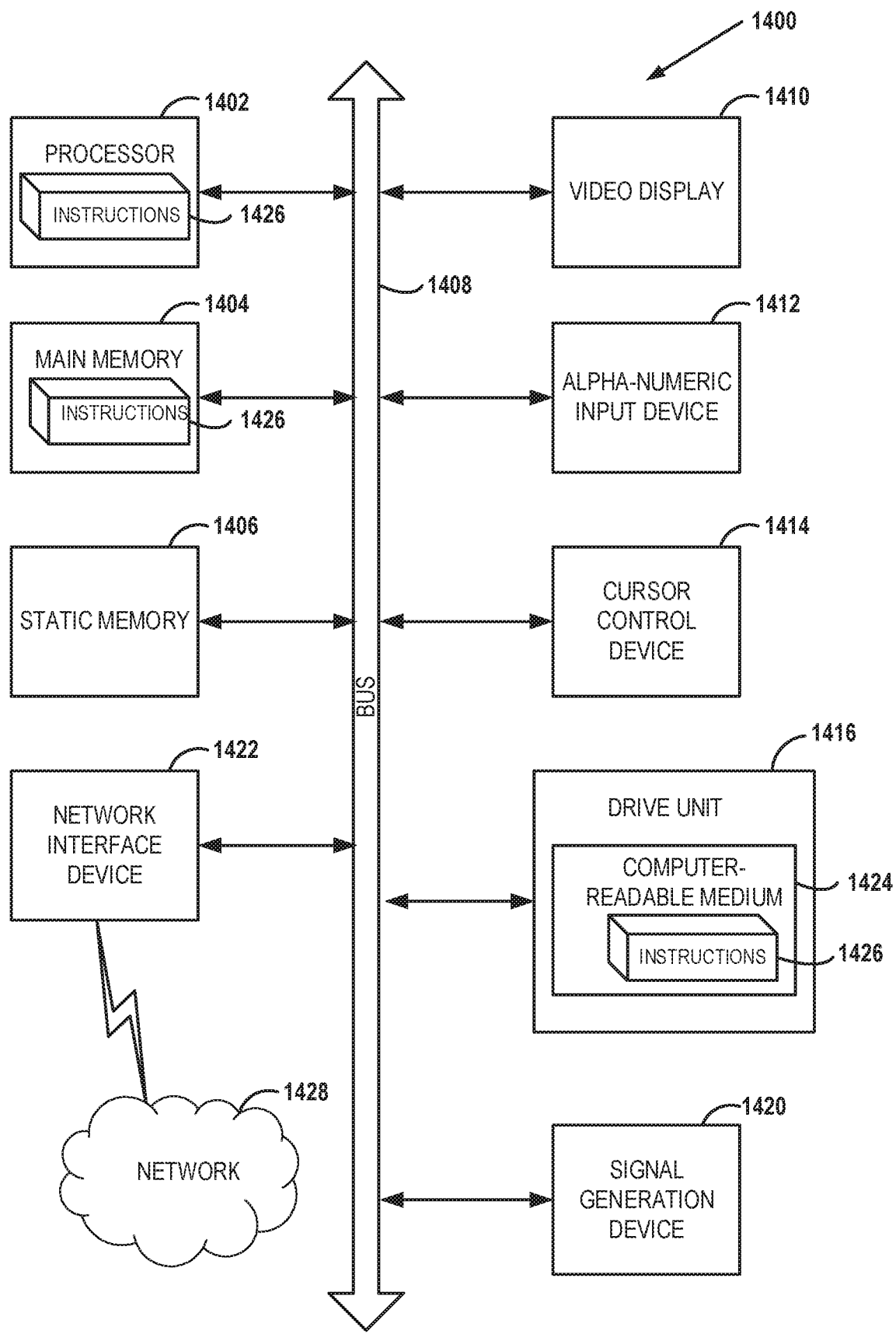
FIG. 6 is a block diagram illustrating components of a machine able to read instructions from a machine-readable medium and perform any of the methodologies discussed herein, according to an example embodiment.

FIG. 6 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a computing device integrated within and/or in communication with a vehicle, a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1400 includes a processing system (processor) 1402, a main memory 1404 (e.g., read-only memory (ROM), flash memory, dynamic random access memory (DRAM) such as synchronous DRAM (SDRAM)), a static memory 1406 (e.g., flash memory, static random access memory (SRAM)), and a data storage device 1416, which communicate with each other via a bus 1408.

Processor 1402 represents one or more processing devices such as a microprocessor, central processing unit, or the like. More particularly, the processor 1402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1402 may also be one or more processing devices such as an application specific integrated circuit (ASIC), a field programmable gate array (FPGA), a digital signal processor (DSP), network processor, or the like. The processor 1402 is configured to execute instructions 1426 for performing the operations discussed herein.

The computer system 1400 may further include a network interface device 1422. The computer system 1400 also may include a video display unit 1410 (e.g., a touchscreen, liquid crystal display (LCD), or a cathode ray tube (CRT)), an alphanumeric input device 1412 (e.g., a keyboard), a cursor control device 1414 (e.g., a mouse), and a signal generation device 1420 (e.g., a speaker).

The data storage device 1416 may include a computer-readable medium 1424 on which is stored one or more sets of instructions 1426 (e.g., instructions executed by server machine 120, etc.) embodying any one or more of the methodologies or functions described herein. Instructions 1426 may also reside, completely or at least partially, within the main memory 1404 and/or within the processor 1402 during execution thereof by the computer system 1400, the main memory 1404 and the processor 1402 also constituting computer-readable media. Instructions 1426 may further be transmitted or received over a network 1428 via the network interface device 1422.

While the computer-readable storage medium 1424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "providing," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. A computer program to activate or configure a computing device accordingly may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to practically any type of data. The scope of the disclosure should, therefore, be determined with reference to the appended claims, along with the full scope of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A method comprising:
   receiving, at a device, one or more inputs;
   processing the one or more inputs to compute one or more commands with respect to an UAV, wherein the one or more commands comprise (a) a command to determine a position of the UAV relative to the device, and (b) a command to maneuver the UAV to maintain the position of the UAV relative to the device;
   modifying the one or more commands in view of a navigation preference associated with the UAV; and
   providing the one or more commands, as modified, to the UAV.

2. The method of claim 1, wherein the one or more inputs comprise a distance setting input.

3. The method of claim 2, wherein the distance setting input defines a distance from which the UAV is to be positioned relative to the device.

4. The method of claim 2, wherein receiving one or more inputs further comprises determining, based on the one or more inputs, a position of the device within a space, and wherein processing the one or more inputs to compute one or more commands with respect to the UAV comprises generating a navigation command based on the position of the device within the space and the distance setting input.

5. The method of claim 1, wherein the one or more inputs comprise a motion input.

6. The method of claim 5, wherein the motion input originates from a sensor of the device.

7. The method of claim 5, wherein the one or more commands comprise a motion command that corresponds to the motion input.

8. The method of claim 1, wherein the one or more inputs comprise an acceleration input and wherein processing the one or more inputs comprises generating a command that dictates a speed at which the UAV is to travel.

9. The method of claim 1, wherein the one or more commands further comprises (c) a command to capture one or more images.

10. The method of claim 1, wherein the command to maneuver the UAV further comprises a command to maintain the position of the UAV relative to the device in accordance with a distance setting input.

11. The method of claim 1, wherein the one or more commands further comprise a command to maneuver the UAV to maintain the position of the UAV relative to the user.

12. A non-transitory computer readable medium having instructions stored thereon that, when executed by a processing device, cause the processing device to perform operations comprising:
  receiving, at a device, one or more first inputs;
  processing the one or more first inputs to determine a first gesture performed with respect to the device, the first gesture being associated with one or more first UAV commands;
  receiving, at the device, one or more second inputs;
  processing the one or more second inputs to identify at least one of the one or more first UAV commands; and
  providing the at least one of the one or more first UAV commands to the UAV.

13. The computer-readable medium of claim 12, further comprising:
  receiving, at the device, one or more third inputs;
  processing the one or more third inputs to determine a second gesture performed with respect to the device, the second gesture being associated with one or more second UAV commands;
  receiving, at the device, one or more fourth inputs;
  processing the one or more fourth inputs to identify at least one of the one or more second UAV commands; and
  providing the at least one of the one or more second UAV commands to the UAV.

14. The computer-readable medium of claim 13, wherein the one or more first UAV commands are associated with a first navigation mode of the UAV and wherein the one or more second UAV commands are associated with a second navigation mode of the UAV.

15. The computer-readable medium of claim 13, wherein the one or more first UAV commands are associated with a first operation mode of the UAV and wherein the one or more second UAV commands are associated with a second operation mode of the UAV.

16. A system comprising:
  a processing device; and
  a memory coupled to the processing device and storing instructions that, when executed by the processing device, cause the system to perform operations comprising:
    receiving one or more inputs;
    processing the one or more inputs to compute one or more commands with respect to an UAV;
    modifying at least one of the one or more commands in view of a navigation preference associated with the UAV; and
    providing the modified at least one of the one or more commands to the UAV.

17. The system of claim 16, wherein the one or more commands comprise (a) a command to determine a position of the UAV, and (b) a command to maneuver the UAV to maintain the position of the UAV relative to a device.

18. The system of claim 16, wherein the one or more commands comprise (a) a command to determine a position of the UAV relative to a user, and (b) a command to maneuver the UAV to maintain the position of the UAV relative to the user.

\* \* \* \* \*